(12) United States Patent
Packham et al.

(10) Patent No.: US 9,650,886 B2
(45) Date of Patent: May 16, 2017

(54) EXTENDING THE LIFE OF A COMPROMISED UMBILICAL

(75) Inventors: Andrew Robert Packham, Bristol (GB); Hilton Smart, Bristol (GB)

(73) Assignee: Vetco Gray Controls Limited, Nailsea (GB)

( * ) Notice: Subject to any disclaimer, the term of this patent is extended or adjusted under 35 U.S.C. 154(b) by 146 days.

(21) Appl. No.: 13/116,380

(22) Filed: May 26, 2011

(65) Prior Publication Data
US 2016/0069176 A1    Mar. 10, 2016

(30) Foreign Application Priority Data

May 27, 2010  (GB) .................................. 1008816.9
Jun. 17, 2010  (EP) .................................. 10166268

(51) Int. Cl.
*E21B 47/10*    (2012.01)
*E21B 17/01*    (2006.01)
(Continued)

(52) U.S. Cl.
CPC .......... *E21B 47/102* (2013.01); *E21B 17/003* (2013.01); *E21B 17/01* (2013.01); *E21B 33/0355* (2013.01); *H01R 13/707* (2013.01)

(58) Field of Classification Search
CPC ...... E21B 47/102; E21B 17/003; E21B 17/01; E21B 47/02216; E21B 47/10;
(Continued)

(56) References Cited

U.S. PATENT DOCUMENTS 4,080,025 A    3/1978  Garnier
4,309,734 A *  1/1982  Warren ............... H02H 9/008
                                              323/263

(Continued)

FOREIGN PATENT DOCUMENTS

CN    101015108 A    8/2007
EP      1918508 A1   5/2008
(Continued)

OTHER PUBLICATIONS

Chinese Office Action issued in connection with corresponding CN Application No. 201110161357.4 on Dec. 4, 2014.
(Continued)

*Primary Examiner* — James G Sayre
(74) *Attorney, Agent, or Firm* — GE Global Patent Operation

(57) ABSTRACT

A method of using an umbilical between a surface location and an underwater location of an underwater fluid extraction well system is provided. The umbilical includes an electrical power conductor configured to transmit electrical power at a first frequency from a source at the surface location to the underwater location. The method comprises detecting that the umbilical has been compromised by the ingress of water. In response thereto, the method comprises converting electrical power from the source to electrical power at a second frequency, wherein the second frequency is lower than the first frequency or DC electrical power; transmitting the electrical power at the second frequency or DC electrical power to the underwater location via the conductor; and converting, at the underwater location, the electrical power at the second frequency or DC electrical power to electrical power at a frequency used by the underwater equipment of the well system.

9 Claims, 1 Drawing Sheet

(51) Int. Cl.
*E21B 17/00* (2006.01)
*E21B 33/035* (2006.01)
*H01R 13/707* (2006.01)

(58) Field of Classification Search
CPC ... E21B 17/028; H02J 3/36; H02M 2001/007; H02M 3/158; H02M 7/487; H02M 7/521; H02M 7/53873; Y02E 60/60; G01V 11/002

See application file for complete search history.

(56) References Cited

U.S. PATENT DOCUMENTS

| | | | |
|---|---|---|---|
| 4,636,934 A | 1/1987 | Schwendemann | |
| 4,646,083 A | 2/1987 | Woods | |
| 5,444,184 A | 8/1995 | Hassel | |
| 6,045,333 A | 4/2000 | Breit | |
| 6,750,440 B1 | 6/2004 | Leggett et al. | |
| 7,576,447 B2 * | 8/2009 | Biester | H02J 3/36 307/1 |
| 7,762,743 B2 * | 7/2010 | Smith | B63B 21/66 374/137 |
| 2004/0043501 A1 | 3/2004 | Means et al. | |
| 2005/0029476 A1 | 2/2005 | Biester et al. | |
| 2006/0191681 A1 | 8/2006 | Storm et al. | |
| 2008/0110389 A1 | 5/2008 | Smith | |
| 2009/0146603 A1 * | 6/2009 | Sihler | H02M 3/158 318/812 |

FOREIGN PATENT DOCUMENTS

| | | | | |
|---|---|---|---|---|
| GB | 2332220 A | | 6/1999 | |
| GB | 2332220 B | * | 3/2000 | ......... E21B 33/0355 |
| GB | 2382600 A | | 6/2003 | |
| WO | 0171158 A1 | | 9/2001 | |
| WO | 0184689 A1 | | 11/2001 | |
| WO | 0237640 A1 | | 5/2002 | |
| WO | 2007/086722 A1 | | 8/2007 | |

OTHER PUBLICATIONS

GB Search report issued in connection with corresponding GB Application No. GB1008816.9 on Apr. 24, 2015.

Australian Office Action issued in connection with corresponding AU Application No. 2011202452 on Jun. 30, 2015.

Great Britain Search Report issued in connection with GB Application No. GB1008816.9, Jul. 14, 2010.

* cited by examiner

EXTENDING THE LIFE OF A COMPROMISED UMBILICAL

BACKGROUND OF THE INVENTION

Embodiments of the present invention relate to extending the life of a compromised umbilical.

One of the most common problems with a subsea umbilical between a fluid extraction well surface platform and a well complex is degradation of the insulation impedance between internal conductors of the umbilical and earth, i.e. the surrounding sea water. In practice, the umbilical is compromised by the in ingress of sea water, causing the capacitance between the conductors and earth to increase substantially, with resultant increase of leakage currents and less power available for the well complex. Embodiments of the present invention enable a solution to this problem by saving the need to replace the umbilical.

Various systems for providing electrical power to an underwater location are described in: GB-A-2 332 220; GB-A-2 382 600; WO01/84689; WO02/37640; U.S. Pat. No. 5,444,184; U.S. Pat. No. 4,646,083; U.S. Pat. No. 4,636,934; WO01/71158; U.S. Pat. No. 4,080,025; and U.S. Pat. No. 6,045,333.

BRIEF DESCRIPTION OF THE INVENTION

According to one embodiment of the present invention, a method of using an umbilical between a surface location and an underwater location of an underwater fluid extraction well system is provided. The umbilical includes an electrical power conductor configured to transmit electrical power at a first frequency from a source at the surface location to the underwater location. The method comprises detecting that the umbilical has been compromised by the ingress of water. In response thereto, the method comprises converting electrical power from the source to electrical power at a second frequency, wherein the second frequency is lower than the first frequency or DC electrical power; transmitting the electrical power at the second frequency or DC electrical power to the underwater location via the conductor; and converting, at the underwater location, the electrical power at the second frequency or DC electrical power to electrical power at a frequency used by the underwater equipment of the well system.

In an alternate embodiment of the present invention, a method of using an umbilical between a surface location and an underwater location of an underwater fluid extraction well system is provided. The umbilical includes an electrical power conductor configured to transmit electrical power at a first frequency from a source at the surface location to the underwater location. The method comprises detecting that the umbilical has been compromised by the ingress of water. In response thereto, the method comprises converting electrical power from the source to electrical power at a second frequency, wherein the second frequency is lower than the first frequency or DC electrical power; transmitting the electrical power at the second frequency or DC electrical power to the underwater location via the conductor; and converting, at the underwater location, the electrical power at the second frequency or DC electrical power to electrical power at a frequency used by the underwater equipment of the well system. The frequency of electrical power used by the underwater equipment of the well system is the same as the first frequency. Detecting that the umbilical has been compromised by the ingress of water comprises: monitoring a voltage of electrical power from the umbilical; and producing an indication that the umbilical has been compromised by the ingress of water if the voltage is less than a threshold According to an alternate embodiment of the present invention, an underwater fluid extraction well system is provided. The underwater fluid extraction well system includes a source of electrical power at a first frequency positioned at a surface location. The system also includes an umbilical comprising an electrical conductor, wherein the umbilical is configured to transmit electrical power from the source via the electrical conductor of the umbilical to an underwater location for use by underwater equipment of the well system. The system also includes a detector configured to detect that the umbilical has been compromised by the ingress of water. The system further includes a first converter positioned at the surface location configured to convert electrical power from the source to electrical power at a second frequency, wherein the second frequency is lower than the first frequency or DC electrical power; and a second converter positioned at the underwater location configured to convert electrical power at the second frequency or DC electrical power to electrical power at a frequency used by said underwater equipment of the well system.

DETAILED DESCRIPTION OF THE INVENTION

Figure 1A:
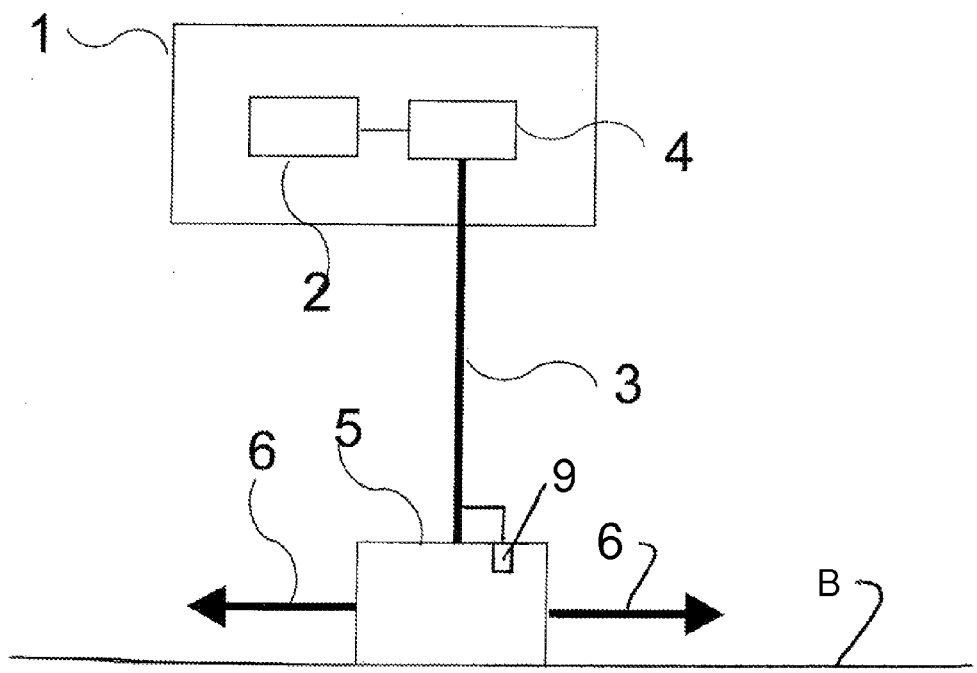
FIG. 1a shows schematically a typical existing arrangement using an umbilical.

Referring first to FIG. 1a, this shows schematically a typical existing arrangement of a surface platform 1 with an AC electrical power source 2 (typically operating at 50 or 60 Hz) connecting to the power conductors within an umbilical 3 via an electrical power and control module (EPCM) 4. The seabed end of the umbilical 3 connects to a distribution assembly 5 on the seabed B, the assembly 5 feeding electrical power to a multiplicity of wells via power connections 6.

Figure 1B:
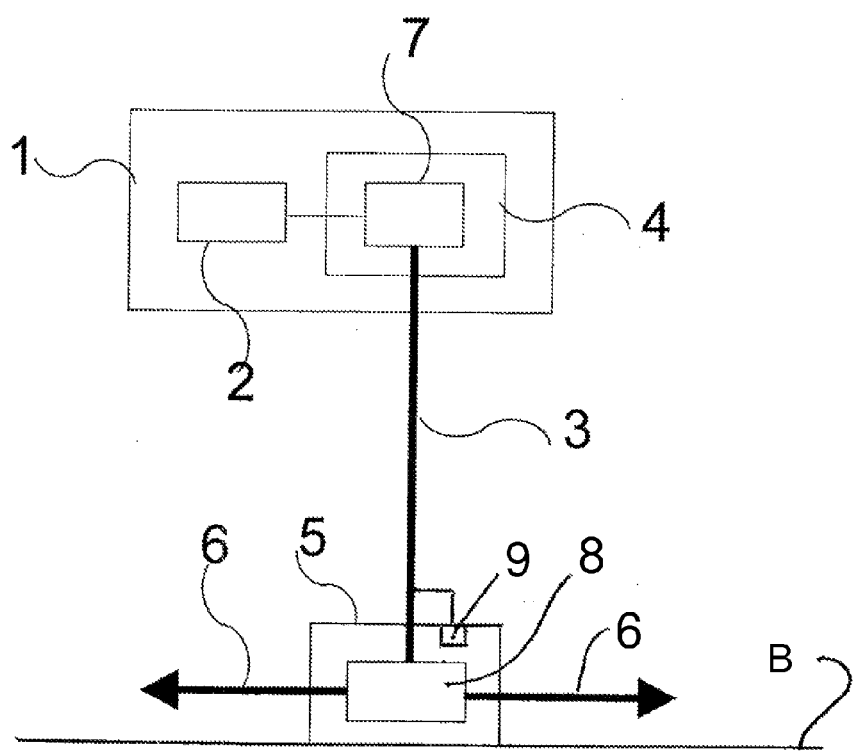
FIG. 1b shows schematically an arrangement using an embodiment of the invention.

Referring to FIG. 1b, this shows schematically an arrangement operating according to an embodiment of the invention. In FIG. 1b, items which correspond with those in FIG. 1a have the same reference numerals as FIG. 1a. The umbilical 3 has been compromised by the ingress of sea water, causing the capacitance between its power conductors and earth to increase substantially with resultant increase of leakage currents and less power available to the well complex.

An electronic converter 7 is installed in the EPCM 4 and receives AC electrical power from source 2 (typically at 50 or 60 Hz) and outputs electrical power at a lower frequency. A frequency of 16⅔ Hz is a favoured choice as communications on power (COP) electrical power control equipment operating at this frequency is readily available as a result of this frequency being a standard for the railway industry. A possible alternative is for the converter 7 to be one which simply rectifies the AC input power to produce DC electrical power and thus feed this DC electrical power down the umbilical 3 instead of AC electrical power. Both lower frequency AC and DC will substantially overcome the initial problem with the increased capacitance of the insulation of the compromised umbilical 3.

At the seabed end of the umbilical 3, a second electronic converter 8 is installed in the distribution assembly 5 or, as a possible alternative, is housed in a module on the seabed B and connected to the end of the umbilical 3 before it reaches the distribution assembly 5. The actual location of the subsea converter 8 will depend on the existing installation configuration. The converter 8 receives electrical power at the lower frequency, or DC, and outputs electrical power at the original power supply frequency for use by underwater equipment of the well complex via power connections 6.

The steps by which it had been determined that the umbilical 3 had become compromised were as follows. If conventional monitoring equipment 9 at the underwater location, for example (as shown) at the distribution assembly 5 or a module before it, indicated that the voltage of power from the power conductors in the umbilical 3 had dropped below a threshold, detection of this at the platform 1 is an indication, on the one hand, to install inverter 7 in EPCM 4 and, on the other hand, to install inverter 8 subsea, typically using a remotely operated vehicle (ROV).

Alternatively, the converters 7 and 8 could be pre-installed at the surface location and subsea respectively, and switched into operation in the EPCM 4 and in the distribution assembly 5 or module if the monitoring equipment 9 indicates that the voltage of power from the power conductors in the umbilical 3 drops below a threshold.

Embodiments of the present invention allows the problems of an umbilical which is failing due to water ingress to be substantially overcome, thus allowing a prolonged life for a well complex without having to replace the expensive umbilical.

What is claimed is:

1. A method of using an umbilical between a surface location and an underwater location of an underwater fluid extraction well system, the umbilical comprising an electrical power conductor configured to transmit electrical power at a first frequency from a power source at the surface location to the underwater location, the method comprising:
   detecting that the umbilical has been compromised by the ingress of water and, in response thereto:
   converting electrical power from power source to electrical power at a second frequency, wherein the second frequency is lower than the first frequency;
   transmitting the electrical power at the second frequency to the underwater location via the conductor; and
   converting, at the underwater location, the electrical power at the second frequency to electrical power at a frequency used by the underwater equipment of the well system.

2. The method of claim 1, wherein the frequency of electrical power used by the underwater equipment of the well system is the same as the first frequency.

3. The method of claim 1, wherein the umbilical is connected to a distribution unit at the underwater location.

4. The method of claim 1, wherein the umbilical is connected to a module at the underwater location, the module being position before a distribution unit of the well system.

5. The method of claim 1, wherein the underwater location is on the bed of a body of water surrounding the umbilical.

6. The method of claim 1, wherein detecting that the umbilical has been compromised by the ingress of water comprises:
   monitoring a voltage of electrical power from the umbilical; and
   producing an indication that the umbilical has been compromised by the ingress of water if the voltage is less than a threshold.

7. A method of using an umbilical between a surface location and an underwater location of an underwater fluid extraction well system, the umbilical comprising an electrical power conductor configured to transmit electrical power at a first frequency from a power source at the surface location to the underwater location, the method comprising:
   detecting that the umbilical has been compromised by the ingress of water and, in response thereto:
   converting electrical power from the source to electrical power at a second frequency, wherein the second frequency is lower than the first frequency;
   transmitting the electrical power at the second frequency to the underwater location via the conductor; and
   converting, at the underwater location, the electrical power at the second frequency to electrical power at a frequency used by the underwater equipment of the well system, wherein:
   the frequency of electrical power used by the underwater equipment of the well system is the same as the first frequency; and
   detecting that the umbilical has been compromised by the ingress of water comprises:
   monitoring a voltage of electrical power from the umbilical; and producing an indication that the umbilical has been compromised by the ingress of water if the voltage is less than a threshold.

8. An underwater fluid extraction well system, comprising:
   a power source of electrical power at a first frequency positioned at a surface location;
   an umbilical comprising an electrical conductor, wherein the umbilical is configured to transmit electrical power from the power source via the electrical conductor of the umbilical to an underwater location for use by underwater equipment of the well system;
   a detector configured to detect that the umbilical has been compromised by the ingress of water;
   a first converter positioned at the surface location, wherein upon detection of an ingress of water, the first converter is configured to convert electrical power from the power source to electrical power at a second frequency, wherein the second frequency is lower than the first frequency; and
   a second converter positioned at the underwater location configured to convert electrical power at the second frequency to electrical power at a frequency used by said underwater equipment of the well system.

9. The system of claim 8, wherein the detector comprises monitoring equipment configured to monitor a voltage of electrical power from the umbilical and to produce an indication that the umbilical is compromised by the ingress of water if the voltage is less than a threshold.

* * * * *